(No Model.)
A. T. LUNDQVIST.
SHOW CASE FOR COOLING OYSTERS, &c.
No. 319,418. Patented June 2, 1885.
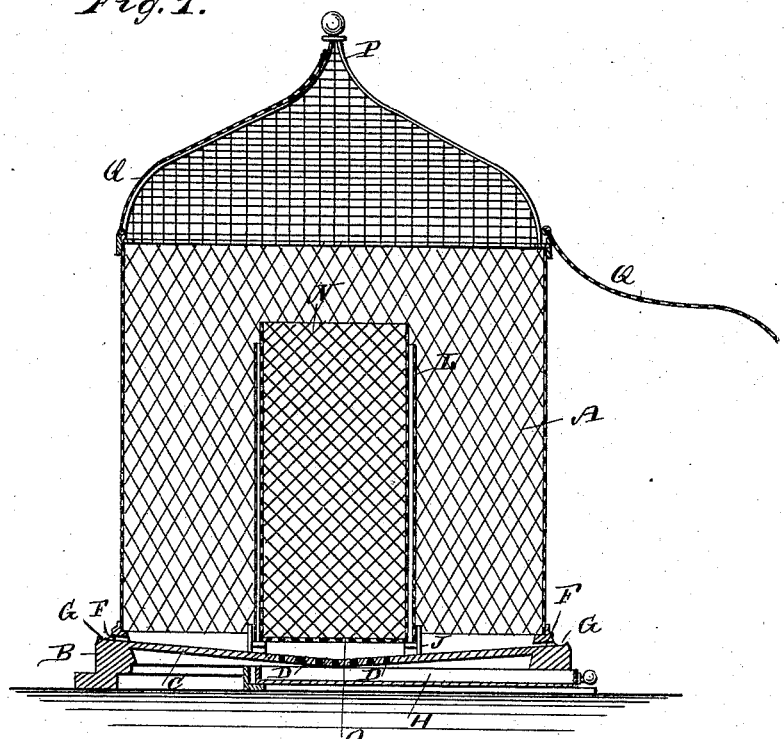
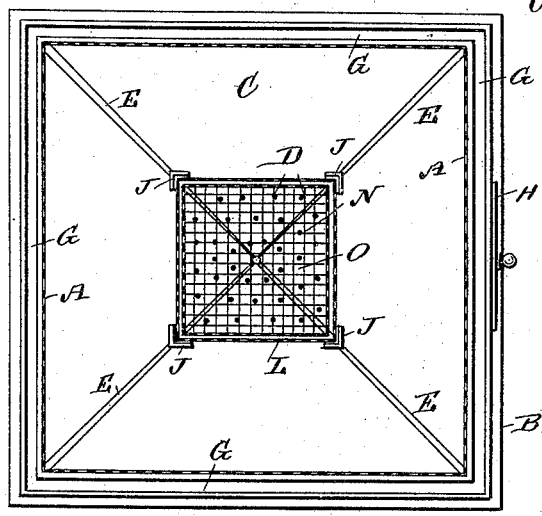
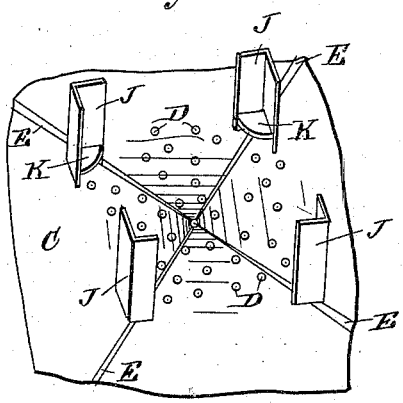
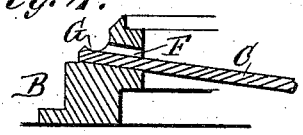
WITNESSES:
Theo. G. Hoster
C. Sedgwick
INVENTOR:
A. T. Lundqvist
BY
ATTORNEYS.

UNITED STATES PATENT OFFICE.

ALEXIUS T. LUNDQVIST, OF NEW YORK, N. Y.

SHOW-CASE FOR COOLING OYSTERS, &c.

SPECIFICATION forming part of Letters Patent No. 319,418, dated June 2, 1885.

Application filed November 15, 1884. (No model.)

*To all whom it may concern:*

Be it known that I, ALEXIUS T. LUNDQVIST, of the city, county, and State of New York, have invented a new and Improved Oyster Show-Case, of which the following is a full, clear, and exact description.

The object of my invention is to provide a new and improved case or box for exhibiting and displaying oysters or other shell-fish upon the counters of eating-houses, &c., and at the same time to keep them fresh and cool, and carry off the drip-water, &c.

Reference is to be had to the accompanying drawings, forming part of this specification, in which similar letters of reference indicate corresponding parts in all the figures.

Figure 1 is a cross-sectional view of my improved oyster show-case. Fig. 2 is a sectional plan view of the same. Fig. 3 is a perspective view of the middle of the bottom. Fig. 4 is a cross-sectional view of the base.

A square or other wire-netting case, A, rests upon a base-frame, B, on which the bottom or floor, C, is secured, provided at its middle with perforations D, and inclined downward from the sides toward the middle.

A diagonal groove, E, extends from each corner down to the middle of the floor.

Small channels F lead from a groove, G, in the base to the grooves E, and conduct the drip-water collecting in the groove G to the grooves E.

A drawer, H, serving as a drip-pan for the water, dirt, &c., is provided in the base B.

On the middle portion of the floor C are four standards, J, which are provided with brackets K, adapted to support an upright cage or basket, L, open at the top and bottom, and in the basket or cage L a smaller basket or cage, N, is placed for receiving the ice, this basket having an apertured floor, O.

The frame A is provided with a removable top, P, of which two or more sides, Q, are hinged.

The ice is placed in the inner cage, N, which is then placed into the cage L.

The oysters are placed between the cage L and the frame or case A.

The sides Q of the top or cover P are swung down to remove the oysters, and the top or cover is removed before lifting out the ice-cage N or replacing it.

The ice-cage can easily be removed without disturbing the oysters, as the outer ca , L, prevents them from falling into the space formerly occupied by the ice-cage.

The case may be made any desired size or shape and with or without a top, and the ice cage or basket may have any desired suitable size or shape.

Having thus described my invention, what I claim as new, and desire to secure by Letters Patent, is—

1. In a show-case or exhibiting device for oysters and other shell-fish, the combination, with a wire case, of a wire cage or basket within the said case, and an additional cage or basket within the above-mentioned cage or basket, substantially as herein shown and described.

2. In a show-case or exhibiting device for oysters and other shell-fish, the combination, with the wire case A, of the standards J on the bottom of the same, and of the wire cages or baskets L N, substantially as herein shown and described.

3. In a show-case or exhibiting device for oysters or other shell-fish, the combination, with the case, of the base B, having a groove, G, and channels F, and of the floor C, substantially as herein shown and described.

4. In a show-case or exhibiting device for oysters and other shell-fish, the combination, with the wire case A, of the base B, having a groove, G, and channels F, the case A and the floor C having grooves E, extending toward the middle, and apertures D, substantially as herein shown and described.

5. In a show-case or device for exhibiting oysters and other shell-fish, the combination, with the wire case A, with or without a cover, of the removable ice-basket in the center of the case, substantially as herein shown and described.

6. In a show-case or exhibiting device for oysters and other shell-fish, the combination, with the case A, having a bottom, C, provided with perforations at the middle, of the drip-drawer H, and an ice cage or basket held above the perforated part of the bottom or the floor, substantially as herein shown and described.

ALEXIUS T. LUNDQVIST.

Witnesses:
OSCAR F. GUNZ,
C. SEDGWICK.